United States Patent [19]

Vaughn

[11] E Re. 29,443

[45] Reissued Oct. 18, 1977

[54] FIREPLACE ASSEMBLY FOR MOBILE HOMES

[76] Inventor: Charles O. Vaughn, c/o Richard J. Hammond, 2345 Partridge Lane, Lancaster, Pa. 17601

[21] Appl. No.: 768,900

[22] Filed: Feb. 15, 1977

Related U.S. Patent Documents

Reissue of:

[64] Patent No.: 3,970,067
Issued: July 20, 1976
Appl. No.: 545,980
Filed: Jan. 31, 1975

[51] Int. Cl.[2] ..... F24B 1/18

[52] U.S. Cl. ..... 126/120; 126/56; 296/23 R

[58] Field of Search ..... 126/120, 121, 276, 56; 296/23 R; 237/51

[56] References Cited

U.S. PATENT DOCUMENTS

| | | | |
|---|---|---|---|
| 2,398,240 | 4/1946 | Merryweather et al. | 126/140 |
| 2,462,383 | 2/1949 | Goodwin | 126/56 |
| 3,094,980 | 6/1963 | Inabnit | 126/121 |
| 3,874,364 | 4/1975 | Fauser | 126/121 |
| 3,888,231 | 6/1975 | Galluzo et al. | 126/120 |
| 3,910,251 | 10/1975 | Andrew | 126/120 |

*Primary Examiner*—Ronald C. Capossela
*Attorney, Agent, or Firm*—Richard J. Hammond

[57] ABSTRACT

A fireplace assembly for mobile homes comprising primarily a firebox housing with a means for cooling the firebox and chimney during the combustion of solid fuels by an intake housing of outside air. Means is provided whereby outside air is permitted to enter the immediate area of burning fuel after first passing through a combustion air conduit located below the bottom of the firebox housing.

8 Claims, 5 Drawing Figures

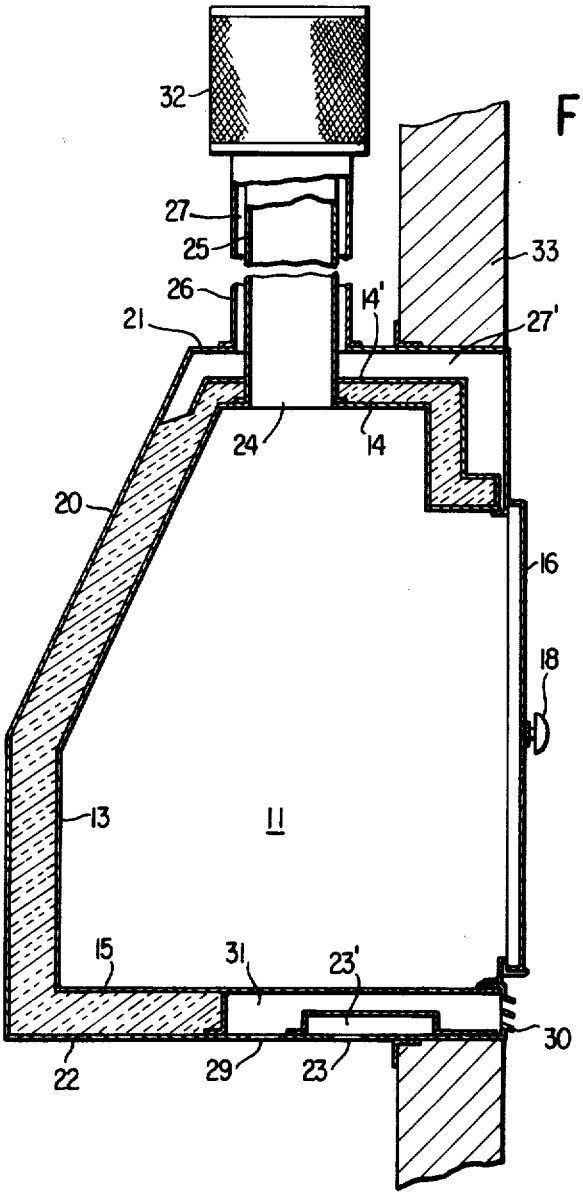
FIG.1
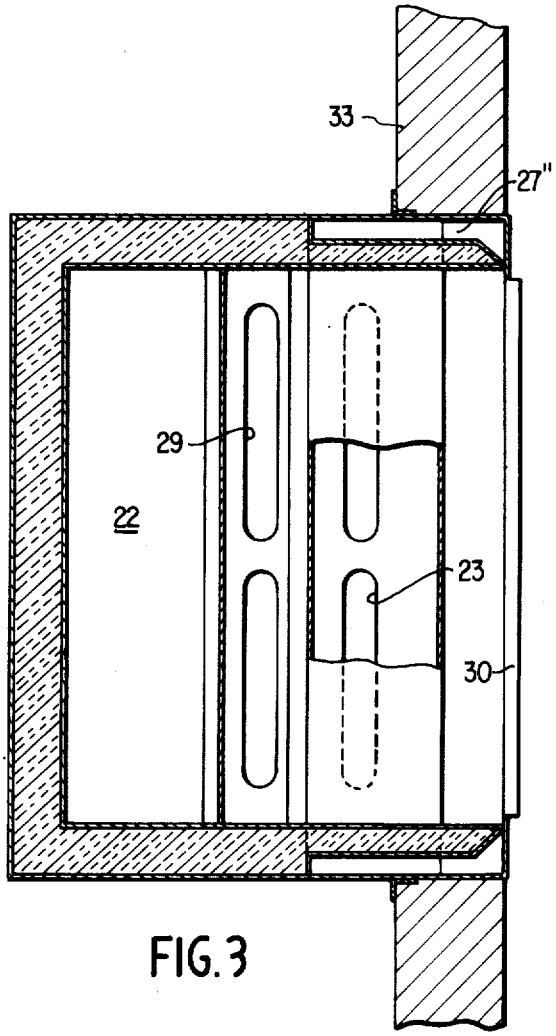
FIG.3
FIG.5
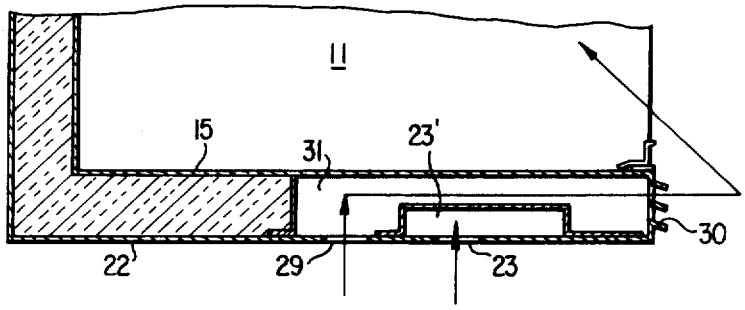

FIREPLACE ASSEMBLY FOR MOBILE HOMES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a fireplace, and more particularly to a solid fuel burning prefabricated fireplace construction adapted to be mounted in mobile homes.

2. Description of the Prior Art

The quality of mobile homes has, over the years, improved as a result of advances in fabricating techniques. In particular, these mobile homes have been made "tighter" due to better construction materials and techniques in assembling. Thus, the prevalence of minute openings from the inside of the mobile home to the exterior has been reduced in both number and size. Further, the addition of weather stripping, storm doors, storm windows and single sheets of wall ceiling and floor covering gives rise to mobile home units of exceptional air tightness.

In order to achieve an operational fireplace, the construction must be such that for each cubic foot of air carried away by a fireplace flue, an equal amount of air must enter into the fireplace opening. Of the air entering the fireplace, a portion must be made available at or near the base of the fuel so as to support proper combustion during the burning operation. This air, termed the "combustion air", facilitates burning by three distinct processes. Primary air must be present at the surface of the fuel to initiate the burning process. Secondary air must be present in the proximity of the flame to ignite with the gases generated by the primary combustion. Excess air must be available to blend with the products of combustion and become the vehicle by which the combustion products are carried off through the flue.

Fireplaces of conventional design are generally unfit for use in mobile homes. In particular, as a result of their exceptional tightness, these conventional fireplaces are unsafe to operate in mobile homes since the combustion air necessary to cause burning of the solid fuel is not continuously available to either support combustion to or carry away the products of combustion. Thus, while the solid fuel initially burns, after a brief time, the lack of combustion air results in a greatly retarded combustion. The ultimate result is a smoldering fuel surface emitting great clouds of toxic vapors and sparks. While normally such materials of retarded combustion would pass harmlessly through the flue and up the chimney, in the very "tight" configuration of mobile homes, an entirely different effect is observed. As a result of the warm air and products of combustion entering the flue, thermo syphon aspiration occurs and a slight reduction in pressure in the flue is produced.

Since there is no available make up air from the interior of the mobile home, this slight reduction in pressure is transmitted through the entire inside of the mobile home. Exhaust is therefore impossible. The ultimate result then is that the interior of the mobile home becomes dangerously filled with toxic vapors and sparks.

The only method found successful for the burning of solid fuels in conventional design fireplaces in mobile homes has, to this point, been accomplished by leaving a window or door ajar, thus permitting the entrance of exterior air for burning and carrying away the combustion materials.

It is generally recognized that fireplace modules designed for mounting in wall or window openings of existing building structures can most economically be produced if insulating material is kept to a minimum. The concept of a firebox housing separated from an outer wrapper housing by an air space has now been established as an alternate method of fireplace insulation. Cooling of the outer housing is readily accomplished by movement of either inside or exterior air between the walls of the outer wrapper housing and the firebox housing. For example, Northwood, U.S. Pat. No. 3,190,281 and Northwood et al., U.S. Pat. Nos. 3,049,113 and 3,123,063 provide for outside air to cool an annular space in fireplaces installed in existing building structures. While these fireplaces also provide for the entrance of outside air directly into the firebox housing, they would be completely ineffective for use in mobile homes since such air enters the top of the firebox housing, and above any burning solid fuel. The air would be clearly unavailable in the combustion process. Thus, as in the more conventionally designed fireplaces, the burning of solid fuel in fireplaces of this design would ultimately give rise to a fire that would be quickly retarded, emitting smoke and sparks into the interior of the mobile home.

A need exists therefore to provide a fireplace for mobile homes that is both efficient and safe.

SUMMARY OF THE INVENTION

Accordingly, one object of the present invention is to provide a fireplace structure particularly suited for use with mobile homes.

Another object of the present invention is to provide a fireplace for mobile homes in which outside air is fed from beneath the hearth directly onto the burning solid fuel.

A further object of the present invention is to provide a fireplace for mobile homes which incorporates the features of safety and efficiency.

Briefly, these objects and other objects of the present invention as hereinafter will become more readily apparent from the following description in connection with the accompanying drawings, wherein like character references refer to the same or similar parts throughout the several views, and in which:

FIG. 1 is a cross-sectional vertical view of the invention showing the fireplace mounted in the mobile home wall;

FIG. 3 is a bottom view of the present invention;

FIG. 5 is an enlarged cross-sectional vertical view of the combustion air and cooling air conduits.

DETAILED DESCRIPTION OF THE PREFERRED EMBODIMENTS

Figure 2:
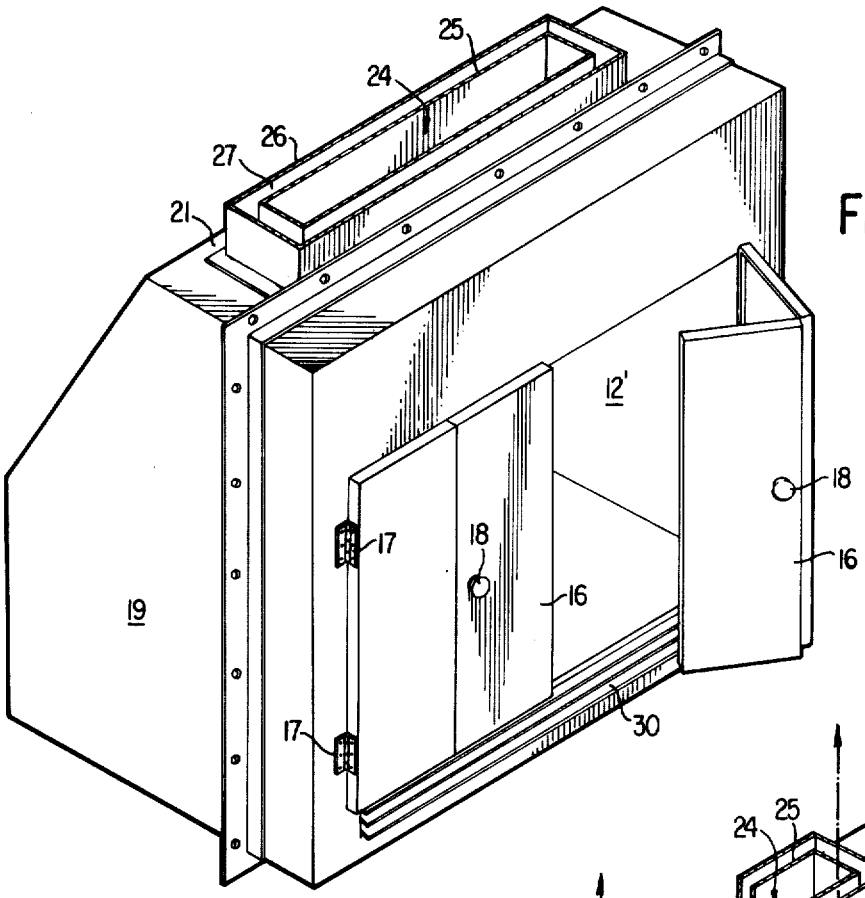
FIG. 2 is a perspective view of the present invention.

Referring now to the drawings and more specifically to FIGS. 1 and 2, a fireplace for mobile homes can be shown to include a hollow firebox housing 11 made of a suitable heat resistant material. Firebox housing 11 is composed of sidewalls 12 and 12', a backwall 13, and topwall 14, and a bottom wall 15, all constructed of sheet metal and forming a solid fuel burning chamber forwardly opening into the mobile home interior. The firebox housing 11 also includes a pair of hinged air tight doors 16 of suitable fire resistant material to ensure safe operation of the mobile home fireplace. The doors 16 are provided with hinges 17 which enable the doors 16 to be opened by means of handles 18. The firebox 11 is secured fixedly within a suitable fire resistant outer wrapper enclosure so as to prevent the fireplace from being a fire hazard.

The outer wrapper enclosure is composed of sidewalls 19 and 19', a backwall 20, a topwall 21 and a bottom wall 22, all constructed of sheet metal. Between the outer wrapper backwall 20 and the firebox backwall 13, the outer wrapper of bottom wall 22 and the firebox bottom wall 15, the inner wrapper wall 14' and firebox top wall 14 and the outer wrapper sidewalls 19 and 19' and the firebox side walls 12 and 12' is placed any suitable heat resistant, fire resistant insulating material such as is well known in the prior art.

Figure 4:
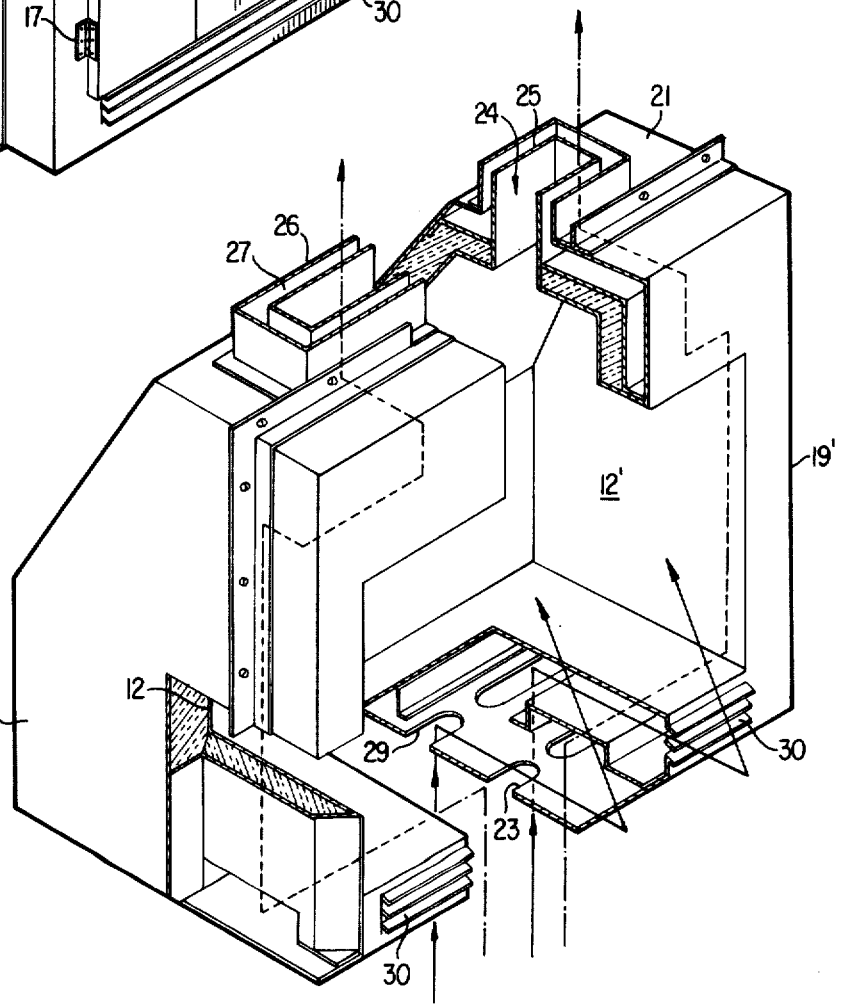
FIG. 4 is a perspective view of the present invention with parts broken away particularly showing the path of travel of air currents between the various walls.

As best seen in FIGS. 3 and 4, the outer wrapper bottom wall 22 has an opening 23 forwardly formed therein and separated from the firebox bottomwall 15 by sheet metal cooling air intake conduit 23'. The outer wrapper enclosure is constructed of sheet metal with the rear portion extending outwardly to the exterior of the mobile home walls 33. The topwall of the firebox 14 and the topwall of the outer wrapper 21 is spaced forwardly from the backwalls 13 and 20 so as to form a draft opening 24 in the rear portion of the mobile home fireplace. This draft opening is necessary for carrying off fumes and products of combustion within the fireplace housing when solid fuel is burned.

The fumes formed within the firebox 11 travel upwardly through the draft opening 24 into the sheet metal chimney assembly 25. An outer wrapper 26 of sheet metal is fixedly mounted through the topwall of the outer wrapper 21 and surrounds the chimney 25 creating an annular air spacing 27 between the outer wrapper 26 and substantially the entire chimney. The air spacing 27 provides continuous air conduit between the outer wrapper 26 and the chimney 25 extended into the space between the inner wrapper 14' and the firebox topwall 14, then to the space between the outer wrapper sidewalls 19 and 19' and the firebox sidewalls 12 and 12' and to that space forwardly fixed between the outer wrapper bottomwall 22 and the firebox bottomwall 15 connecting to the opening in the outer wrapper bottomwall.

As best seen in FIG. 5, in outer wrapper bottomwall 22 is formed opening 29 rearwardly mounted with relation to opening 23. Sheet metal combustion air passage 31 encloses sheet metal passage 23' and connects opening 29 to combustion air louvers or dampers 30. Combustion air louvers 30 are disposed immediately below the firebox bottomwall 15 and opening to the interior of the mobile home for controlling the passage of exterior air therein. In operation, exterior cooling air enters conduit 23 as a result of the heat generated from burning solid fuel in the firebox 11. The cooling air travels upwardly between the sidewalls in air passage 27'' thence to the air passage in the topmost portion of the fireplace 27' and into the air passage 27 adjacent to the chimney assembly 25. This air exits from the topmost portion of the chimney to the exterior of the mobile home at 32.

As best seen in FIGS. 4 and 5, combustion air enters conduit 29 traveling through air passage 31 and directly into the interior of the mobile home through combustion air louvers 30. As a result of the updraft from the burning of the solid fuel in firebox 11, the combustion air immediately enters the bottom of firebox 11 to support combustion at the surface of the burning fuel. The products of combustion and any excess air are carried off through draft opening 24 and up chimney assembly 25 exiting to the outside air at 32.

As a safety feature, doors 16 act as an internal damper for controlling the passage of combustion air into the firebox housing and when closed, isolating the products of combustion from the living air in the mobile home. These doors replace the damper assembly common to most fireplaces, which, in mobile homes, if closed, could create a hazardous condition. For example, attempting to build a fire with the damper inadvertantly closed results in a minimal or smoldering fire where products of combustion would enter the living area rather than the flue. The safety doors effectively prohibit any such effect. Further, overfiring from burning of paper and the like also is no longer a problem since closing the safety doors effectively shuts out the fire and products of overfiring.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A fireplace assembly particularly suited for use with a mobile home or the like, which fireplace assembly comprises in combination:

A. a firebox housing secured to an exterior wall and communicating with the interior of the mobile home;

B. a chimney communicating with the interior of the firebox housing for conducting away the products of combustion formed therein to the exterior of the mobile home;

C. a continuous annular spacing formed in the walls of said firebox housing and said chimney;

D. a combustion air intake means connected to said firebox housing for conducting exterior air directly into the interior of a mobile home *and thereby inhibiting thermosyphonic aspiration* said combustion air intake means including a [first] conduit formed within the lower portion of the firebox housing;

E. a cooling air intake means connected to said firebox housing for conducting exterior air into said annular spacing for cooling the firebox housing and chimney [said cooling air intake means including a second conduit formed within said first conduit, and thereby inhibiting thermosyphonic aspiration];

F. a closure means for controlling the passage of combustion air from the interior of the mobile home to the interior of the firebox housing.

2. The fireplace assembly of claim 1, wherein the closure means includes a pair of doors hingedly connected to the firebox housing.

3. The fireplace assembly of claim 1, wherein the firebox housing includes heat insulation means for minimizing heat transfer between the interior and exterior of the firebox housing.

4. The fireplace assembly of claim 1, wherein the firebox housing includes a front portion which is substantially flush with the interior wall of the mobile home and a rear portion which extends rearwardly of the exterior wall of the mobile home.

5. The fireplace assembly of claim 1, wherein the chimney is connected to and extends substantially vertically from the top of the firebox housing.

6. The fireplace assembly of claim 1, wherein the continuous annular spacing surrounds substantially the entire chimney and the portion of the firebox housing directly adjacent the wall of the mobile home.

7. The fireplace assembly of claim 1, wherein the combustion air intake means further includes a damper means for varying the passage of exterior [art] *air* from the [first] conduit to the interior of the mobile home.

*8. A fireplace assembly particularly suited for use with a mobile home or the like, which fireplace assembly comprises in combination:*

*A. a firebox housing secured to an exterior wall and communicating with the interior of the mobile home;*

*B. a chimney communicating with the interior of the firebox housing for conducting away the products of combustion formed therein to the exterior of the mobile home;*

*C. a continuous annular spacing formed in the walls of said firebox housing and said chimney;*

*D. a combustion air intake means connected to a source of exterior air for conducting exterior air directly into the interior of a mobile home and thereby inhibiting thermosyphonic aspiration;*

*E. a cooling air intake means connected to a source of exterior air for conducting exterior air into said annular spacing for cooling the firebox housing and chimney;*

*F. a closure means for controlling the passage of combustion air from the interior of the mobile home to the interior of the firebox housing.*

* * * * *